US011892806B2

(12) United States Patent
De Oliveira et al.

(10) Patent No.: US 11,892,806 B2
(45) Date of Patent: Feb. 6, 2024

(54) OSCILLATING WEIGHT WITH VARIABLE GEOMETRY FOR A TIMEPIECE MECHANISM

(71) Applicant: Guenat SA Montres Valgine, Breuleux (CH)

(72) Inventors: Pedro De Oliveira, Couvet (CH); Frédéric Crettex, Prangins (CH)

(73) Assignee: Guenat Sa Montres Valgine, Les Breuleux (CH)

( * ) Notice: Subject to any disclaimer, the term of this patent is extended or adjusted under 35 U.S.C. 154(b) by 221 days.

(21) Appl. No.: 17/289,615

(22) PCT Filed: Nov. 4, 2019

(86) PCT No.: PCT/IB2019/059428

§ 371 (c)(1),
(2) Date: Apr. 28, 2021

(87) PCT Pub. No.: WO2020/089877

PCT Pub. Date: May 7, 2020

(65) Prior Publication Data

US 2021/0373495 A1 Dec. 2, 2021

(30) Foreign Application Priority Data

Nov. 2, 2018 (CH) ...................................... 1345/18

(51) Int. Cl.
*G04B 5/08* (2006.01)
*G04B 5/16* (2006.01)
*G04B 5/18* (2006.01)

(52) U.S. Cl.
CPC ............... *G04B 5/08* (2013.01); *G04B 5/165* (2013.01); *G04B 5/187* (2013.01)

(58) Field of Classification Search
CPC ........... G04B 5/165; G04B 5/187; G04B 5/08
See application file for complete search history.

(56) References Cited

U.S. PATENT DOCUMENTS

| | | | |
|---|---|---|---|
| 2,593,685 | A | 4/1952 | Maar |
| 7,217,030 | B2 | 5/2007 | Papi |

(Continued)

FOREIGN PATENT DOCUMENTS

| | | | |
|---|---|---|---|
| CH | 707942 A2 | 10/2014 | |
| EP | 1136891 A1 | 9/2001 | |

(Continued)

OTHER PUBLICATIONS

International Search Report for PCT/IB2019/059428, dated Jan. 31, 2020, 2 pgs.

*Primary Examiner* — Renee S Luebke
*Assistant Examiner* — Matthew Hwang
(74) *Attorney, Agent, or Firm* — Blank Rome LLP

(57) ABSTRACT

An oscillating weight (I) with variable geometry for a timepiece mechanism has a first and a second part (10; 20), and an axis of rotation (40) shared by the first and the second part (10; 20). At least one part (10; 20) is arranged in order to oscillate about the axis of rotation. A differential mechanism (30) is connected to the first and to the second part (10; 20) so as to vary the position of one part relative to the other through a rotational movement of at least one of the parts about the axis of rotation (40). Owing to the presence of the differential mechanism (30), the user of the watch can vary the geometry of the oscillating weight (I) directly and therefore the position of its centre of gravity, and thus adapt it to their lifestyle (for example, sport mode, normal mode).

9 Claims, 9 Drawing Sheets

(56) References Cited

U.S. PATENT DOCUMENTS

| | | | |
|---|---|---|---|
| 7,754,136 | B2 | 7/2010 | Chou |
| 9,182,743 | B2 | 11/2015 | Rochat et al. |

FOREIGN PATENT DOCUMENTS

| | | | |
|---|---|---|---|
| EP | 1445668 | A1 | 8/2004 |
| EP | 1918789 | A1 | 5/2008 |
| EP | 2544055 | A1 | 1/2013 |

OSCILLATING WEIGHT WITH VARIABLE GEOMETRY FOR A TIMEPIECE MECHANISM

RELATED APPLICATIONS

This application is a national phase of PCT/IB2019/059428, filed on Nov. 4, 2019, which claims the benefit of Swiss Application No, CH01345/18, filed on Nov. 2, 2018. The entire contents of these applications are hereby incorporated by reference.

TECHNICAL FIELD

The present invention relates to an oscillating weight with variable geometry for a timepiece mechanism, and a timepiece mechanism comprising such a weight and a timepiece comprising such a weight and/or such a mechanism.

STATE OF THE ART

Oscillating weights for automatic watches are well known and widely used. Typically, an oscillating weight is used to ensure the winding of a movement through its oscillations created by the movements of the wearer of the watch. The weight is mounted to pivot for example by means of a bearing. As a general rule, a reverser ensures the conversion of the reciprocating movement of the weight into a one-way rotary movement. The geartrains of the winding system ensure the link between the various elements. The rotational driving of the winding geartrain is used to arm an energy source of the watch, for example the spring of a barrel.

Watches are known in which the oscillating weight is arranged at the bottom of the case, for example mounted on the side of the bridges of the watch. Also known are watches in which the oscillating weight is arranged matched to the dial of the watch.

Oscillating weights are known which are not visible to the wearer of the watch. Also known however are automatic watches provided with an oscillating weight that is visible to the wearer on the back or front face of the watch.

An ideal oscillating weight has both a great weight and a great moment of inertia, which allows an effective winding of the watch. It can concentrate most of its weight on its outer periphery. Such a weight generally comprises a solid peripheral portion, generally in the form of a circular arc. This portion will hereinafter be called “inertia sector”. In this context, a “plate” links the inertia sector to the bearing, which defines the axis of rotation of the weight.

Generally, such a weight also comprises link elements, for example arms, linking the inertia sector to the bearing. These arms can define cutouts, allowing the elements behind and/or in front of the oscillating weight to be seen, at least partially, while lightening its weight.

Other oscillating weights have no cutouts.

As a general rule, the known oscillating weights are composed of a single part, having a fixed geometry, that is to say a geometry which does not vary over time. Nor does the winding torque of these weights vary over time.

In other known examples, the oscillating weight comprises two or more portions whose relative position does not substantially change over time. In other words, during the movement of the oscillating weight, these portions are synchronous.

For example, the document CH707942 relates to a weight comprising two portions linked by a rigid synchronizing mechanical link, for example a connecting rod, each end of which is secured to one of the portions by a screw. The two portions are always synchronous.

The document EP1136891 relates to two oscillating weights in the same plane, linked by a geartrain so that the two weights still have a synchronous movement, in order to avoid collisions.

The document EP1918789 describes an oscillating weight comprising two portions, of which one portion is displaced on a guiding means on the periphery of the other portion. The portion which is displaced makes it possible to give the initial impulse to the oscillating weight. Then, the two portions have a position that is fixed with respect to one another.

In the case of a one-piece weight or a piece in several portions as presented, in normal conditions of use of the watch, the displacements of the arm of the wearer of the watch bring the weight into imbalance and it is this and the Earth’s gravitational force g which define the torque.

If the wearer is a very active person, the accelerations encountered can be substantially higher. For example, the arm and/or the hand which wears (wear) the watch comprising such an oscillating weight can undergo high accelerations. That occurs, for example, when the user practices a sport such as tennis, golf, etc.

Currently, the winding mechanisms are chosen in such a way that they ensure spring arming conditions for a normally active person. The result thereof is that, for a highly active wearer, the barrel spring is greatly stressed and risks wear which cannot be excluded. If, on the other hand, the wearer is not very active, it is possible that the barrel spring will not be sufficiently armed.

In such cases, it would be desirable for the movement of the weight not to cause the winding of the watch in certain conditions. However, that would mean that, in the case of “normal” use of the watch, that is to say, for example when the user does not practice a sport, the winding of the watch would no longer be performed.

The document EP1445668 relates to an oscillating weight comprising two portions that are removable with respect to one another, and arranged so that their relative displacement generates a radial displacement of the center of gravity of the oscillating weight. Thus, it is possible to vary the working conditions of the mechanism and adapt it to the lifestyle of the wearer.

However, the oscillating weight described in the document EP1445668 has certain disadvantages. In fact, to displace the center of gravity of the oscillating weight, the watch has to be brought to a horologist trained for that purpose, because this displacement is done by unscrewing screws and nuts which set the position of the first part with respect to the second. Then the second part has to be moved into a new position and the screws and nuts have to be screwed back.

Changing the geometry and therefore the position of the center of mass (or at the center of gravity) of the watch is therefore neither simple nor immediate. It cannot be done by the wearer of the watch.

The user of known watches cannot directly vary the geometry of the oscillating weight, and therefore the position of its center of gravity and thus adapt it to his or her lifestyle (for example, sporty, normal, . . . ).

In other words, a user has no known solutions for acting himself or herself on the watch so that the movement of the weight does not cause the winding of the watch in certain conditions (for example, and in a nonlimiting manner, when practicing a sport), and also so that the movement of the weight on the other hand causes the winding of the watch in other conditions (for example, and in a nonlimiting manner, when he or she has finished practicing his or her sport).

The document EP2544055 describes an oscillating part such as an oscillating weight, in which a front-facing surface of the oscillating part is used as an additional display surface. In one example, the oscillating weight bears a dial and three output displays, notably three hands. The three hands are linked, via geartrains, to three output mobiles revolving about the main pivoting axis of the mechanism. The dial is borne by a dial wheel, which is linked via an intermediate geartrain to a toothing which gives the angular position of the oscillating weight. In this mechanism, the dial remains permanently in the same angular orientation with respect to the plate of the movement, and to the case which contains the latter. This document does not describe a mechanism that makes it possible to vary the center of gravity of the oscillating weight, or the winding torque.

The document U.S. Pat. No. 2,593,685 relates to a mechanism intended to be mounted on the steering wheel of a car and which exploits the movements of the steering wheel and/or the vibrations of the car to wind a watch. To this end, the mechanism comprises a case linked to the steering wheel and comprising two spherical or hemispherical weights, arranged so that the larger one contains the smaller one. The two weights are linked to a "differential" mechanism comprising two parallel tapered gears, both linked to a third tapered gear mounted on a shaft. The mechanism is arranged in such a way that the movements of the weights are converted into a one-way rotational movement of the shaft about the axis, independently of the direction of oscillations of the two weights. In the solution described, the weights are used to rotate the differential mechanism by their movement.

There is therefore a need for an oscillating weight with variable geometry that is free of the limitations of the known oscillating weights.

There is therefore a need for an oscillating weight with variable geometry in which the geometry and therefore the position of the center of gravity of the weight can be varied by the user of the watch without needing to bring the watch to a horologist trained for that purpose.

There is therefore a need for a timepiece mechanism and/or a timepiece such as an automatic watch in which the movement of the weight does not cause the winding of the watch in certain conditions, depending on the wishes of the user.

SUMMARY OF THE INVENTION

One aim of the present invention is to propose an oscillating weight with variable geometry that is free of the limitations of the known oscillating weights.

One aim of the present invention is also to propose an oscillating weight with variable geometry in which the position of the center of mass can be modified by the user of the watch without having to bring the watch to a horologist trained for that purpose.

One aim of the present invention is also to propose a timepiece mechanism and/or a timepiece such as an automatic watch for which the user can directly vary the geometry of the oscillating weight, and therefore the position of its center of gravity, and thus adapt it to his or her lifestyle (for example, sporty, normal, . . . ).

According to the invention, these aims are achieved notably by means of the timepiece.

The oscillating weight with variable geometry for a timepiece mechanism according to the invention comprises:

- a first part,
- a second part,
- a first axis of rotation common to the first part and to the second part, at least one out of the first part and the second part being arranged to be able to oscillate about the first axis of rotation,
- a differential mechanism linked to the first part and to the second part so as to vary the relative position of one part with respect to the other by a rotary movement of at least one of the parts about said axis of rotation, this displacement or these displacements varying the geometry of the oscillating weight and the position of the center of gravity of the oscillating weight.

In this context, a "differential mechanism" is a timepiece mechanism which comprises at least one sun gear and at least one planetary wheel comprising an axis of rotation, arranged both to revolve about this axis of rotation and to revolve around the sun gear.

In a preferential variant, the differential mechanism is a differential mechanism with dual planetary wheel and dual sun gear, that is to say that it comprises two sun gears and two planetary wheels.

By virtue of the presence of the differential mechanism, this solution notably has the advantage over the prior art of being able to vary the geometry of the oscillating weight, and therefore the position of its center of gravity, directly by the use of the watch, without having to bring the watch to a horologist trained for that purpose.

The user can thus ensure that the movement of the weight does not cause the winding of the watch in certain conditions (for example, and in a nonlimiting manner, when practicing a sport), and ensure that the movement of the weight causes the winding of the watch in other conditions (for example, and in a nonlimiting manner, when he or she has finished practicing his or her sport).

BRIEF DESCRIPTION OF THE FIGURES

Examples of implementation of the invention are indicated in the description illustrated by the attached figures in which.

EXAMPLE(S) OF EMBODIMENT(S) OF THE INVENTION

Figure 1A:
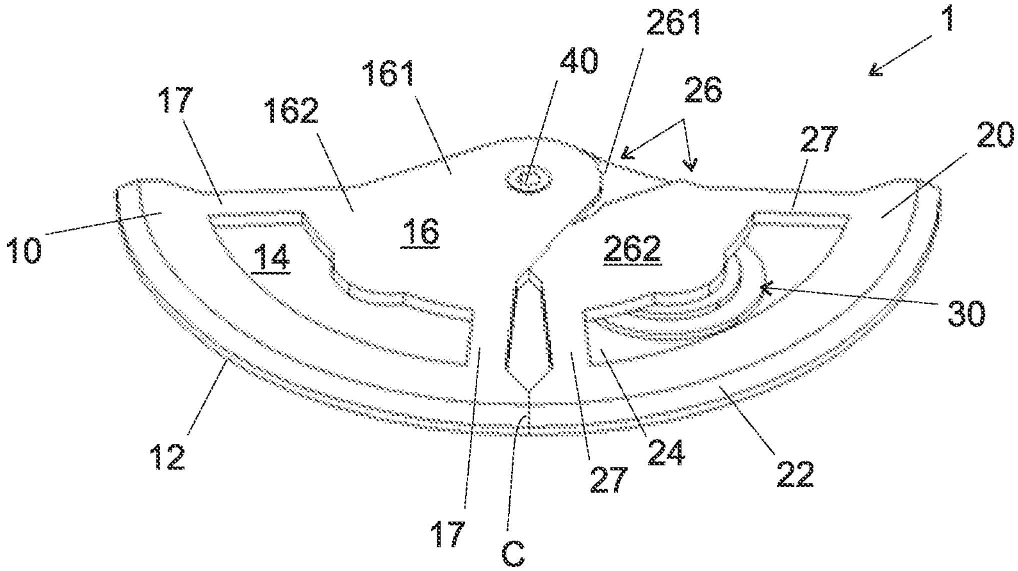
FIG. 1A illustrates a perspective view of a side of the oscillating weight according to an embodiment of the invention, in which the first part of the weight occupies a first position with respect to the second part.

FIG. 1A illustrates a perspective view of a side of the oscillating weight 1 according to an embodiment of the invention, in which the first part 10 of the weight occupies a first position with respect to the second part 20.

In the example of FIG. 1A, the first part 10 comprises, on its periphery, an inertia sector 12 defining the significant share of its weight and a plate 16 linking the sector to a bearing (not illustrated), for example a ball bearing, borne by the oscillating weight 1 and defining a first axis of rotation 40. In the example illustrated, the plate 16 comprises arms 17, defining cutouts 14. In other variants, these cutouts 14 are not present.

In the example of FIG. 1A, the inertia sector 12 has a periphery that is substantially in the form of a circular arc. Furthermore, the first part 10 is substantially in the form of a circular sector, extending over an angle of approximately 60°. In general, this sector can extend over an angle lying within the range 15°-90°.

In the example of FIG. 1A, the plate 16 is substantially flat, that is to say that it extends substantially on a single plane.

In the example of FIG. 1A, the second part 20, which is a part that is different from the first part 10, also comprises, at its periphery, an inertia sector 22 defining the significant share of its weight and a plate 26 linking the sector 22 to the bearing (not illustrated). In this case also, the plate 26 comprises arms 27 defining cutouts 24. In other variants, these cutouts 24 are not present. The presence of cutouts 14, 24 in one of the two parts 10, 20 does not necessarily mean the presence of cutouts in the other part 20, respectively 10.

In the example of FIG. 1A, the inertia sector 22 has a periphery substantially in the form of a circular arc. Furthermore, the first part 10 is substantially in the form of a circular sector, similar to that of the part 20.

Although in the example of FIG. 1A the two parts 10, 20 have substantially the same form and extend substantially over the same angle, that is not an essential feature of the invention. It is in fact possible to imagine parts 10, 20 having different forms and/or which extend over different angles.

In the example of FIG. 1A, the plate 26 of the second part 20 is not substantially flat, but it extends on two planes. In particular, in the example of FIG. 1A, the plate 26 of the second part 20 comprises a first portion 261, proximal to the axis of rotation 40, and a second portion 262, distal from the axis of rotation 40, which belong to two different planes.

In particular, the distance between these two planes 261, 262 corresponds substantially to the thickness of the first part 10 so that when the inertia sector 12 of the first part 10 enters into contact with the inertia sector 22 of the matching second part 20 of the contact region C, the plate 16 of the first part 10 and the second portion 262 of the plate 26 of the second part 20 are coplanar.

In other words, in the example of FIG. 1A, the first part 10 is only partially superposed on the second part 20, matching the first portion 261 of the plate 26 of the second part 20.

In other words again, in the example of FIG. 1A, the inertia sector 12 of the first part 10 is disposed side-by-side with the inertia sector 22 of the second part 20. Furthermore, a first portion 161 of the plate 16 of the first part 10 is superposed on a first portion 261 of the plate 26 of the second part 20 (matching the axis of rotation 40) and a second portion 162 of the plate 16 of the first part 10 is disposed side-by-side with the second portion 262 of the plate 26 of the second part 20.

Obviously, other variants can be imagined, for example and in a nonlimiting manner, the inertia sector 12 of the first part 10 can be disposed side-by-side with the inertia sector 22 of the second part 20 and all the plate 16 of the first part 10 can be superposed on all the plate 26 of the second part 20.

In yet another variant, each of the two parts 10, 20 is flat and a first portion 161 of the plate 16 of the first part 10 is superposed on a first portion 261 of the plate 26 of the second part 20 (matching the axis of rotation 40). The two parts thus remain on two different planes even when they are placed alongside one another. It is possible in this variant for one end of the inertia sector of a part to be superposed partially on the inertia sector of the other part.

In a variant, when the two parts 10, 20 are placed alongside one another, the oscillating weight 1 can comprise means for maintaining the position of one part with respect to the other. For example, one part can bear a finger or lug which engages in a corresponding opening in the other part. Other variants can easily be imagined.

In a variant, the first part 10 and/or the second part 20 are made of a heavy material, often of heavy metal, of gold or of platinum in the high-end watches.

According to the invention, a differential mechanism 30, partially visible in FIG. 1A, is linked to the first part 10 and to the second part 20 so as to vary the relative position of one part with respect to the other by a rotary movement of at least one of the parts about the axis of rotation 40, this rotary movement varying the geometry of the oscillating weight 1 and therefore the position of the center of rotation of the oscillating weight 1 and consequently the winding torque of the watch. This relative displacement of one part with respect to the other is produced by a rotation of at least one of the two parts 10, 20 about the axis 40 of the oscillating weight 1.

Figure 1B:
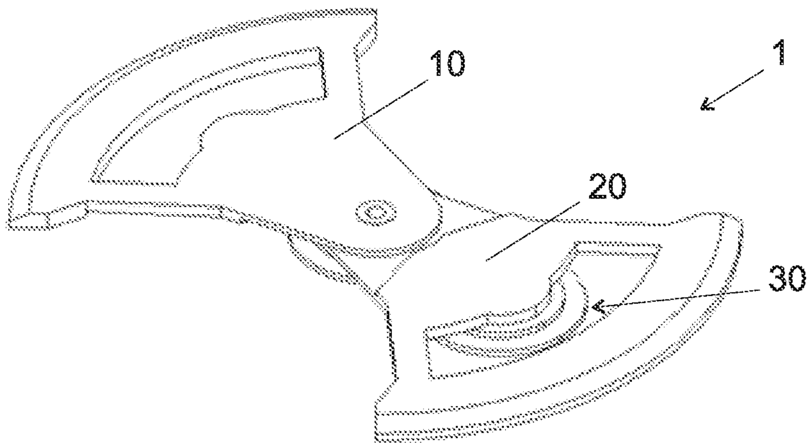
FIG. 1B illustrates a perspective view of the oscillating weight of FIG. 1A, in which the first part of the weight occupies a second position with respect to the second part.

In fact, as can be seen in FIG. 1B, by virtue of this differential mechanism 30, the first part 10 is displaced by comparison to FIG. 1A into a new position in which it is opposite the second part 20, which, in this example, has remained fixed.

In the position of FIG. 1B, the displacement of the weight 1 produces no winding of the energy source of the watch. It is a position which completely cancels the winding movements of the oscillating weight 1. This position corresponds in this case to the configuration in which the two parts 10, 20 of the oscillating weight 1 are opposite with respect to one another. In this case, the center of gravity of the weight is placed at its center.

By contrast, in the configuration of FIG. 1A, the winding of the energy source of the watch is maximal. This maximum winding position corresponds in this case to the configuration in which the two parts 10, of the oscillating weight 1 are alongside one another.

The user can advantageously modify the geometry of the oscillating weight 1 according to the invention, that is to say the winding torque of the watch, at any time, for example between two extreme positions (for example those of FIGS. 1A and 1B). In a variant, only the extreme positions will be able to selected by the wearer of the watch. In another variant, it is possible to also select one or more intermediate positions between these two extreme positions.

In a variant, an indicator that is not illustrated allows the chosen torque to be displayed.

The result thereof is an interaction with the wearer of the watch who adapts the geometry of the two oscillating parts 10, 20 either to take account of his or her activity or, for example, to remain within the zone of optimal tension of the energy source of the watch (for example power reserve in median zone).

Although in the variant of FIGS. 1A and 1B it is the first part 10 which is displaced with respect to the second part 20, it is possible, in addition or as an alternative, for the second part 20 to be displaced with respect to the first part 10.

For example, it is possible, upon the displacement of the first part 10, for the second part 20 to also be displaced.

It is also possible for only the second part 20 to be displaced with respect to the first part 10, which remains fixed.

Although in the variant of FIGS. 1A and 1B the angular displacement of the first part 10 with respect to the second part 20 is performed in the clockwise direction, counter-clockwise displacements or even bidirectional displacements can be provided.

Figure 2:
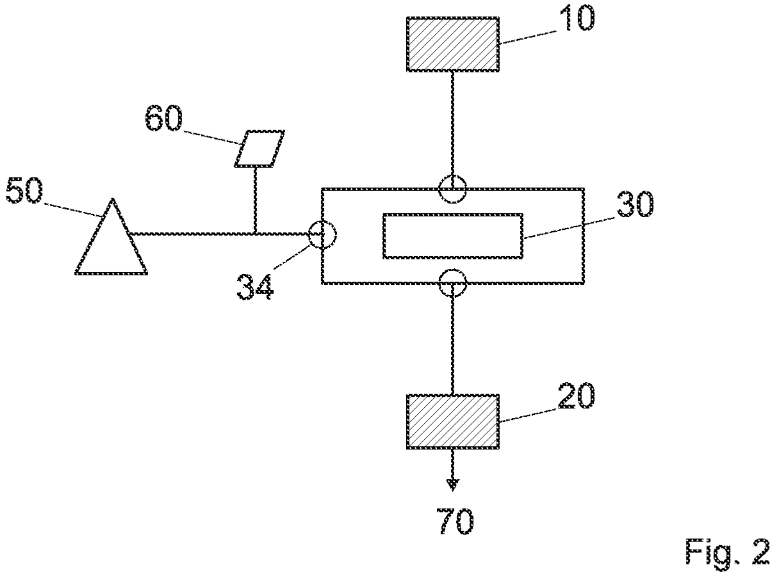
FIG. 2 illustrates a logical diagram of the operation of the oscillating weight according to the invention.

FIG. 2 illustrates a logic diagram of the operation of the oscillating weight 1 according to the invention. By using a means for selecting the desired winding 50 of the watch, for example a crown or a button, the user selects the desired variant. In an alternative, this means can be used to select a mode of operation of the watch, for example from at least two possible modes of operation, each mode of operation corresponding to a predetermined configuration of the two parts 10, 20 of the weight and therefore to a predefined geometry. For example, the user can choose between a "SPORT" mode in which the position of the two parts 10, 20 of the weight does not allow a winding of the watch (for example as illustrated in FIG. 1B) and a "NORMAL" mode, in which the position of the two parts 10, 20 of the weight allows a maximum winding of the watch (for example as illustrated in FIG. 1A).

Possibly, an optional indicator 60 can indicate the chosen configuration of the parts 10, 20 and/or the chosen mode of operation of the watch.

The differential mechanism 30 according to the invention is represented in FIG. 2 as comprising two entries (notably a wheel 34 of the differential mechanism 30 which will be discussed later) and one of the two parts, for example the first part 10 and an exit, for example the other of the two parts 10, 20 (the second part 20 in this case).

Figure 3:
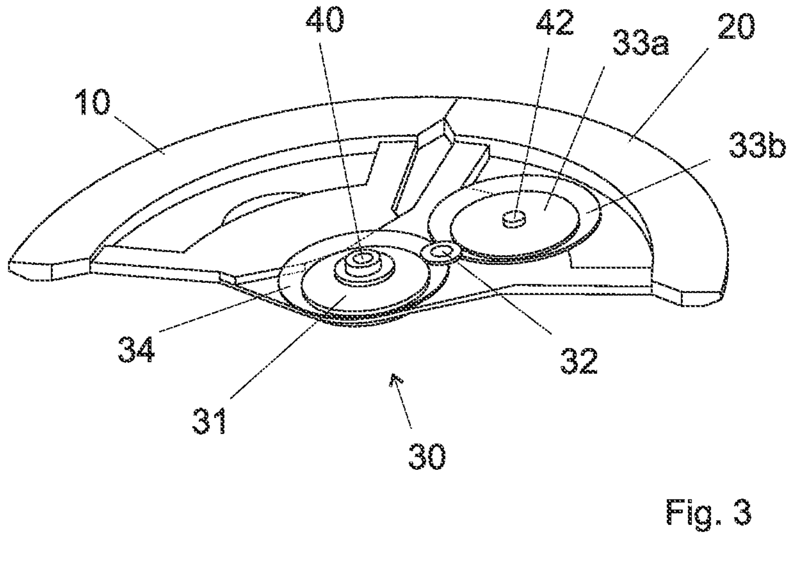
FIG. 3 illustrates a perspective view from another side of the oscillating weight of FIG. 1A.

FIG. 3 illustrates a perspective view of the other side of the oscillating weight 1 of FIG. 1A. In this example, it is possible to see an embodiment of the interaction of the differential mechanism 30 with the parts 10, 20.

In the example of FIG. 3, the differential mechanism 30 comprises a first planetary wheel 33*a*.

In this context, the expression "planetary wheel" denotes a wheel, notably a toothed wheel, which is arranged both to revolve about its axis of rotation and which can at the same time revolve also about another wheel.

In the case of FIG. 3, the first planetary wheel 33*a* comprises an axis of rotation 42, about which it can revolve. It is linked to the second part 20, notably it is borne by the second part 20. It is arranged both to revolve about the second axis of rotation 42 and to revolve about an intermediate wheel 32 linked to the second part 20. The intermediate wheel 32 is therefore a link wheel. In a preferential variant, its dimensions are smaller than those of the central wheels 31, 34 and of the two planetary wheels 33*a*, 33*b*.

The intermediate wheel 32 in the example of FIG. 3 is also borne by the second part 20 and it functions as planetary wheel holder. It meshes with a first central wheel 31 which functions as a sun gear, about which one or more planetary wheels can revolve.

In the variant illustrated, the first sun gear 31 is linked to the first part 10, notably it is borne by the first part 10. It is arranged to revolve about the axis of rotation 40 of the oscillating weight 1.

In the example of FIG. 3, the differential mechanism 30 also comprises a second planetary wheel 33*b*, which, in the case illustrated, is coaxial to the first planetary wheel 33*a*. This second planetary wheel 33*b* is also linked to the second part 20, notably it is borne by the second part 20. It is arranged both to revolve about the axis of rotation 42 and to revolve about a second central wheel 34 which also functions as a sun gear, about which one or more planetary wheels can revolve.

In the variant illustrated, the second sun gear 34 is fixed for most of the time, except during the changing of geometry of the oscillating weight 1. It is arranged to revolve about the axis of rotation 40 of the oscillating weight 1.

The differential mechanism of FIG. 3 is therefore a differential mechanism with dual planetary wheel and dual sun gear.

Although in the example of FIG. 3 the first planetary wheel 33*a* is coaxial with the second planetary wheel 33*b*, in another variant (not illustrated), the two planetary wheels are not coaxial and revolve about different axes.

In the example of FIG. 3, the two central wheels 31, 34 and the two parts 10, 20 of the oscillating weight 1 are all coaxial. They are arranged to revolve about the axis of rotation 40.

In a standard situation, when no modification is made by the wearer of the watch, the sun gear 34 is kept fixed by means of a fixing mechanism (not illustrated) such as a jumper.

In the case of a modification by the wearer of the watch, the second sun gear 34 revolves about the axis of rotation 40, thus driving the second planetary wheel 33*b* about its axis of rotation 42 and around the sun gear 34. The second planetary wheel 33*b* in turn drives the rotation of the first planetary wheel 33*a* about its axis of rotation 42 and around the first sun gear 31. The first sun gear 31 therefore also revolves about the axis of rotation 40, causing the displacement of the first part 10 with respect to the second part 20.

It should be noted that, during the relative displacement of one part 10, 20 with respect to the other 20, 10, the planetary wheels 33*a*, 33*b* revolve both about their axis of rotation 42 and also around the central wheels (or possibly the intermediate wheels). Once the two parts occupy the desired relative position, they are no longer displaced with respect to one another. In this case, during the movement of the oscillating weight 1, the two parts are synchronous and, during their movement, the planetary wheels 33*a*, 33*b* revolve only about their axis of rotation 42.

In the variant of FIG. 3, the control of modification of the geometry of the oscillating weight 1, performed by the wearer of the watch, acts via a geartrain (not illustrated) at a third central wheel (not illustrated) superposed on and secured to a sun gear (for example the second sun gear 34) in order to modify the setting thereof. In a preferential variant, the fineness of the adjustment is a function of the number of teeth of the third central wheel.

Figure 4:
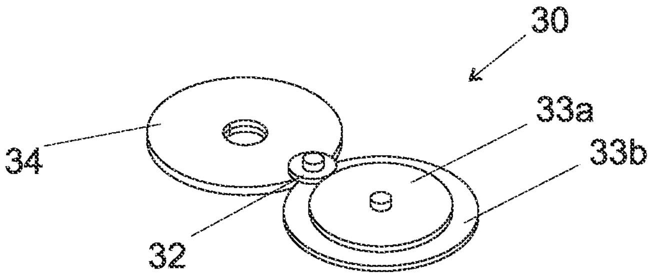
FIG. 4 illustrates a perspective view of an embodiment of the differential mechanism of the weight according to the invention.
Figure 5:
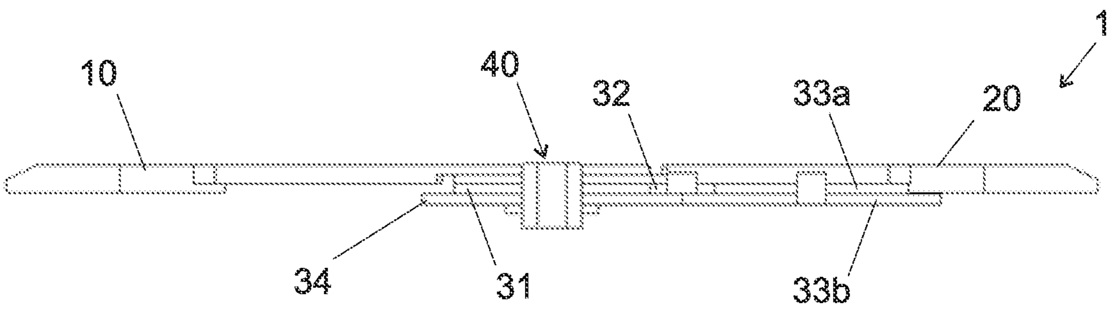
FIG. 5 illustrates a sectional view of the oscillating weight of FIG. 3.

In the variant of FIG. 3, a detail of which is illustrated in FIG. 4 and a cross-sectional view of which is illustrated in FIG. 5, the first planetary wheel 33*a* is smaller than the second planetary wheel 33*b* and the first sun gear 31 is larger than the second sun gear 34.

Figure 6A:
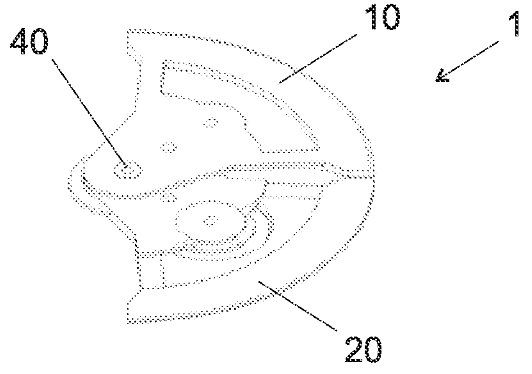
FIGS. 6A to 6C illustrate perspective views of another embodiment of the oscillating weight according to the invention, in which the first part of the weight occupies three different positions with respect to the second part.
Figure 6B:
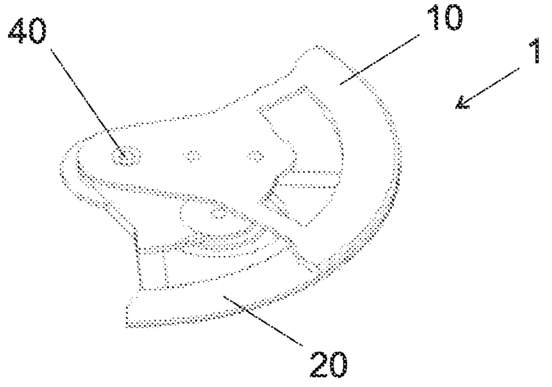
Figure 6C:
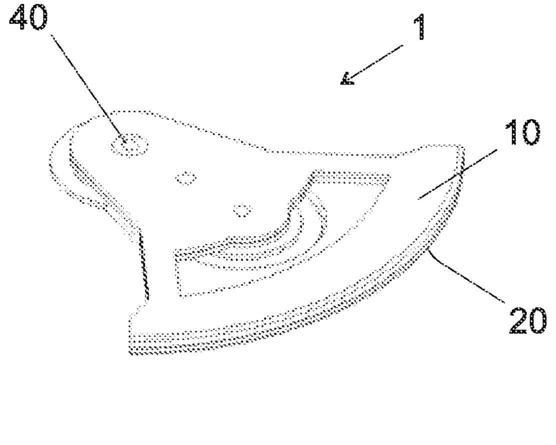

FIGS. 6A to 6C illustrate perspective views of another embodiment of the oscillating weight 1 according to the invention, in which the first part 10 of the weight occupies three different positions with respect to the second part 20. These positions are not limiting and the first part 10 of the weight could occupy a number other than three of different positions with respect to the second part 20.

In the three cases illustrated, the first part 10 is arranged to be completely superposed on the second part 20 (as illustrated in FIG. 6C). When the two parts 10, 20 are completely superposed, their surface occupancy is minimal. In this case, their size and/or their weight can be adapted in order to take account of this particular feature (given equal weight, this oscillating weight, although thicker, occupies a smaller surface area).

In another variant (not illustrated), the oscillating weight 1 comprises several parts (for example three or more) and a differential mechanism arranged to displace the parts so that they are all superposed on one another and to displace them in the manner in which a fan is opened.

In a variant, an indicator (not illustrated) informs the wearer as to the angular difference between the two parts 10, 20 chosen by the wearer of the watch and/or as to the chosen mode of operation and/or as to the geometry of the oscillating weight and/or as to the winding torque of the oscillating weight.

It is for example possible to set, by convention, that this value is zero when the two parts 20, 20 are opposed (as for example in FIG. 1B) and equal to N (N being an integer number, for example N=10) when they are brought alongside one another (as for example in FIG. 1A) or superposed (as for example in FIG. 6C).

In the case where this indicator is visible only on the back of the watch, that is to say the part of the watch which is in contact with the wrist of the user, it can be produced as follows: one of the two parts 10, 20, notably the one which is displaced, can comprise an end of the weight configured so as to represent the end of an indicator such as a hand. A graduation, or any other equivalent means, can be positioned on the other part.

In another variant, an indicator such as a hand is secured to a sun gear, for example the gear 34. This indicator can be indexed with a graduation or any other equivalent means which can for example appear on the dial of the watch, taking into account the relative position of the two parts 10, 20. In this variant, a geartrain linked to the gear 34 can make it possible to display the position of the latter at various points of the dial, for example by means of a hand or of an indicator disk, even on a flank of the case, for example by means of a disk visible through a window.

In another variant, the wheels of the differential mechanism can be dimensioned so that the parts 10, 20 are displaced with the same angular speed. In other variants, the wheels of the differential mechanism are dimensioned so that the parts 10, 20 are displaced with a different angular speed.

In another variant, the angular speed of one part is greater, for example two times or N times greater, than the angular speed of the corresponding sun gear. In a variant, this ratio will be taken into account to dimension a possible correction mechanism.

Figure 7A:
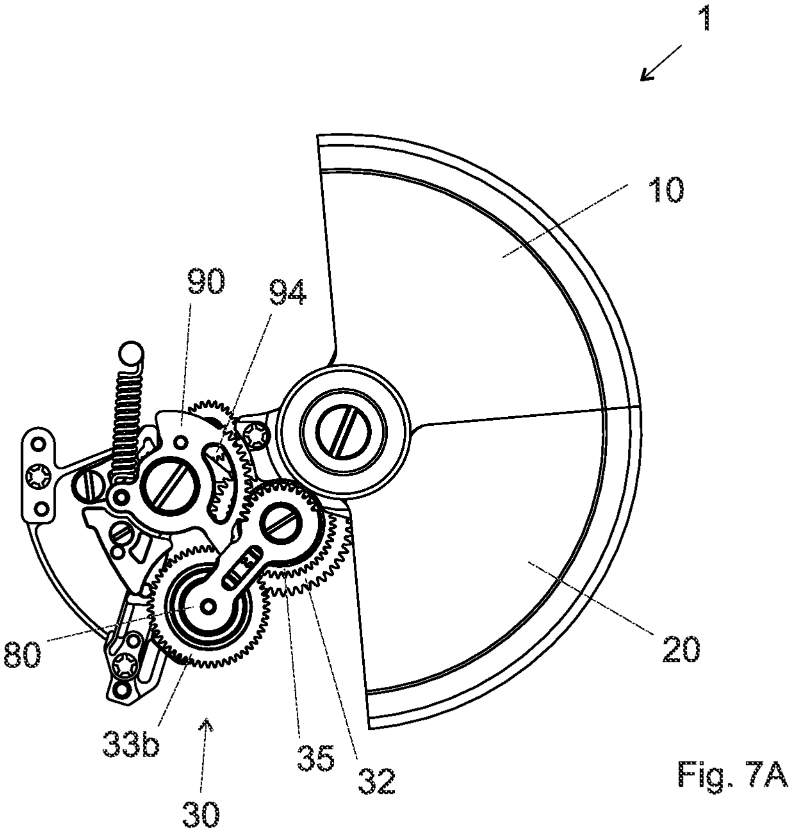
FIG. 7A illustrates a top view of an embodiment of the oscillating weight according to the invention, in which the first part of the weight occupies a first position with respect to the second part.

FIG. 7A illustrates a top view of another embodiment of the oscillating weight 1 according to the invention, in which the first part 10 of the weight occupies a first position with respect to the second part 20. Notably, the first part 10 is disposed alongside the second part 20, in a way similar to FIG. 1A.

Figure 7B:
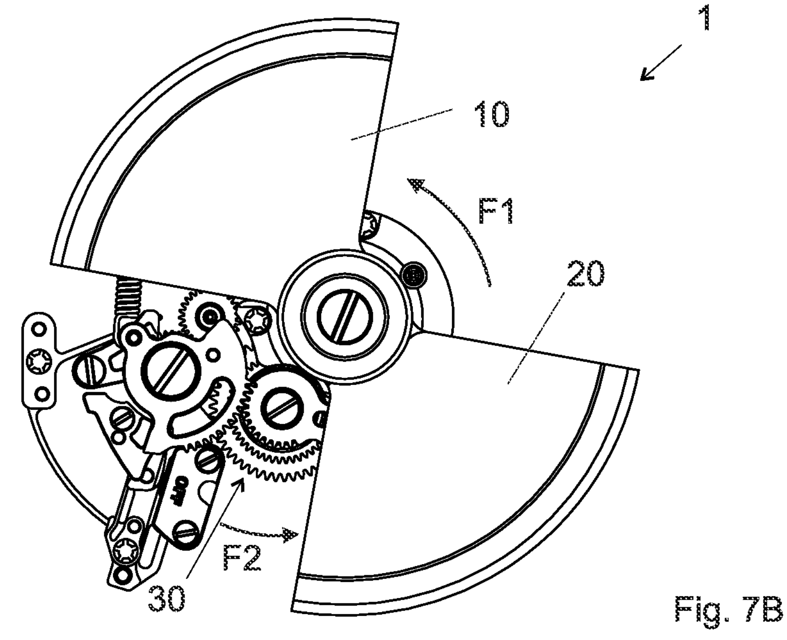
FIG. 7B illustrates a top view of the embodiment of the oscillating weight of FIG. 7A, in which the first part of the weight occupies a second position with respect to the second part.

FIG. 7B illustrates a top view of the embodiment of the oscillating weight of FIG. 7A, in which the first part 10 of the weight 1 occupies a second position with respect to the second part 20. Notably, the first part 10 is opposite the second part 20, in a way similar to FIG. 1B. The arrows F1, F2 indicate the direction of the angular displacement of the first part 10 with respect to the second part 20 (90° in the example illustrated) respectively of the differential mechanism 30.

Figure 8:
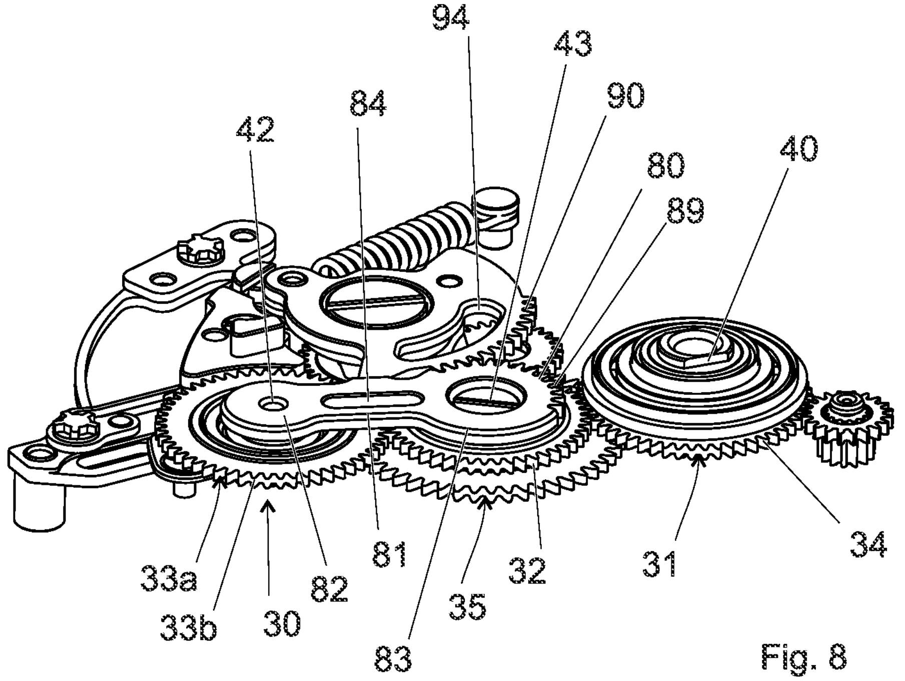
FIG. 8 illustrates a perspective view of a part of an embodiment of the oscillating weight according to the invention.

FIG. 8 illustrates a perspective view of a part of another embodiment of the oscillating weight 1 according to the invention. In this example, it is possible to see an embodiment of the interaction of the differential mechanism 30 with the parts 10, 20.

In the example of FIG. 8, the differential mechanism 30 comprises a first planetary wheel 33*a*. The first planetary wheel 33*a* illustrated comprises an axis of rotation 42, about which it can revolve. It is linked to the first part 10. It is arranged both to revolve about the axis of rotation 42 and to revolve around an intermediate wheel 32 linked to the first part 10. The intermediate wheel 32 is therefore a link wheel.

The intermediate wheel 32 in the example of FIG. 8 functions as a planetary wheel holder. It meshes with a first central wheel 31 which functions as a sun gear, around which one or more planetary wheels can revolve.

In the variant illustrated, the first sun gear 31 is linked to the first part 10. It is arranged to revolve about the axis of rotation 40 of the oscillating weight 1.

In the example of FIG. 8, the differential mechanism 30 also comprises a second planetary wheel 33*b*, which, in the case illustrated, is coaxial to the first planetary wheel 33*a*. This second planetary wheel 33*b* is linked to the second part 20. It is arranged both to revolve about the axis of rotation 42 and to revolve around a second intermediate wheel 35 linked to the second part 20. The intermediate wheel 35 is therefore also a link wheel.

The intermediate wheel 35 in the example of FIG. 8 functions as a planetary wheel holder. It meshes with a second central wheel 34 which functions as a sun gear, around which one or more planetary wheels can revolve.

In the variant illustrated, the first intermediate wheel 32 is coaxial to the second intermediate wheel 35. Notably, these wheels share the axis of rotation 43.

In the variant of FIG. 8, the oscillating weight 1 also comprises a frame 80 which comprises a central position 81, substantially rectilinear, and two ends 82, 83, of substantially circular form. Each of these ends bears an axis, notably the end 82 bears the axis of rotation 42 of the first and second planetary wheels 33*a*, 33*b* and the end 83 bears the axis of rotation 43 of the first and second intermediate wheels 32, 35. In a preferential variant, the frame 80 is arranged to revolve about the axis of the axis of rotation 43 of the first and second intermediate wheels 32, 35.

In the variant illustrated, the frame 80, notably its central portion 81, comprises an opening 84, to lighten the weight thereof.

The end 83 of the frame 80, which bears the axis of rotation 43 of the first and second intermediate wheels 32, 35, comprises a toothing 89 to be able to mesh with a control wheel 90.

In the variant of FIG. 8, the control wheel 90 comprises an opening 94 to lighten the weight thereof.

The oscillating weight 1 of FIGS. 7A, 7B and 8 relies on a differential principle. In fact, when the chassis 80 is rotated over a given angle, the information supplied to the frame is relayed by the geartrain (planetary wheels 33*a*, 33*b*, intermediate wheels 32, 35), thus allowing for an angular phase-shifting of the two parts 10, 20.

In fact, in the variant of FIG. 8, under the angular action of the control wheel 90, the frame 80 drives the two planetary wheels 33*a*, 33*b* that are linked to one another, thus generating a rotation of at least one intermediate wheel and therefore of the corresponding sun gear, which means that the corresponding part (the part 10 in the example) will be shifted angularly by the desired angle.

In the variant of FIG. 8, the first planetary wheel 33*a* is smaller than the second planetary wheel 33*b*; the first intermediate wheel 32 is larger than the second intermediate wheel 35. Finally, the first sun gear 31 is smaller than the second sun gear 34.

In the variant of FIG. 8, the first planetary wheel 33*a*, the first intermediate wheel 32 and the first sun gear 31 are on one and the same first plane; the second planetary wheel 33*b*, the second intermediate wheel 35 and the second sun gear 34 are on one and the same second plane, which, in FIG. 8, is lower than the first plane.

In the variant of FIG. 8, the movement of the control wheel 90 drives the movement of the end 83 of the frame 80, notably its rotation about the axis 43. This rotation, in one embodiment, drives the rotation of the second planetary wheel 33*b* about its axis 42. Since the second planetary wheel 33*b* meshes with the second intermediate wheel 35, the latter revolves in turn about the axis of rotation 43. Since the second intermediate wheel 35 meshes with the second sun gear 34, the latter in turn revolves about the axis of rotation 42, thus making the second part 20 revolve about the same axis of rotation 42.

In another variant, alternative to or in addition to the preceding one, the movement of the control wheel 90 drives the movement of the end 83 of the frame 80, notably its rotation about the axis 43. This rotation, in one embodiment, drives the rotation of the first planetary wheel 33*a* about its axis 42. Since the first planetary wheel 33*a* meshes with the first intermediate wheel 32, the latter in turn revolves about the axis of rotation 43, the second intermediate wheel 35 remaining fixed. Since the first intermediate wheel 32 meshes with the first sun gear 31, the latter in turn revolves about the axis of rotation 42, thus making the first part 10 revolve about the same axis of rotation 42.

Figure 9:
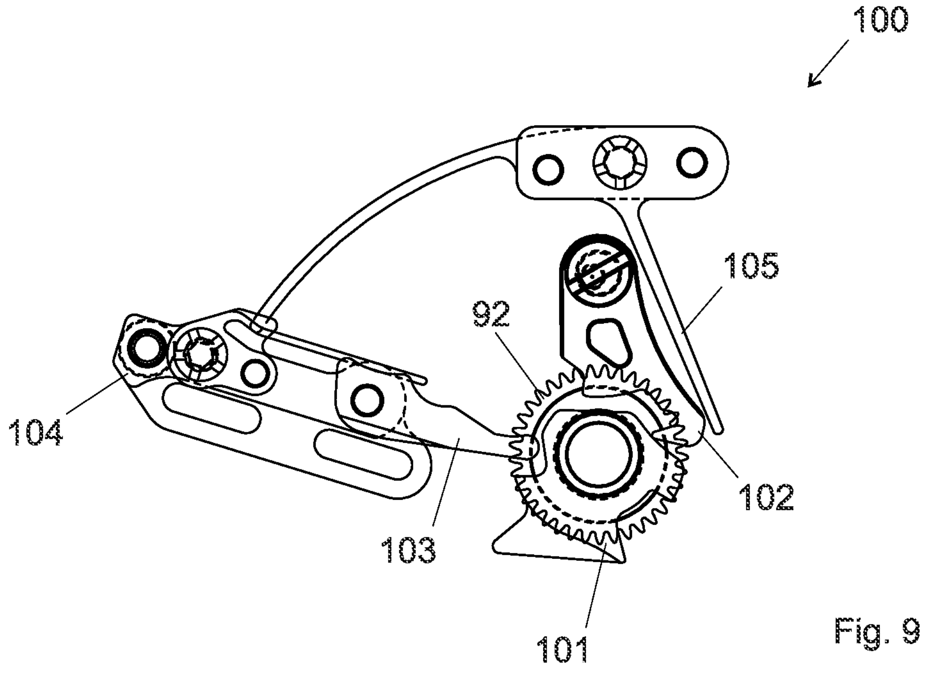
FIG. 9 illustrates a top view of the control mechanism of an embodiment of the oscillating weight according to the invention, in a first, rest position.

FIG. 9 illustrates a top view of the control mechanism 100 of an embodiment of the oscillating weight according to the invention, in a first position of rest. In the example illustrated, a shuttle principle has been used, thus making it possible to select two positioning states of one part 10, 20 with respect to the other 20, 10 with a two-way angular displacement.

In the variant of FIG. 9, the control mechanism 100 comprises a cam 101 coaxial to the control wheel 90 (not visible), a beak 103 cooperating with the cam 101 and linked to a control device 104, and a bolt 102 cooperating also with the cam 101.

Figure 10:
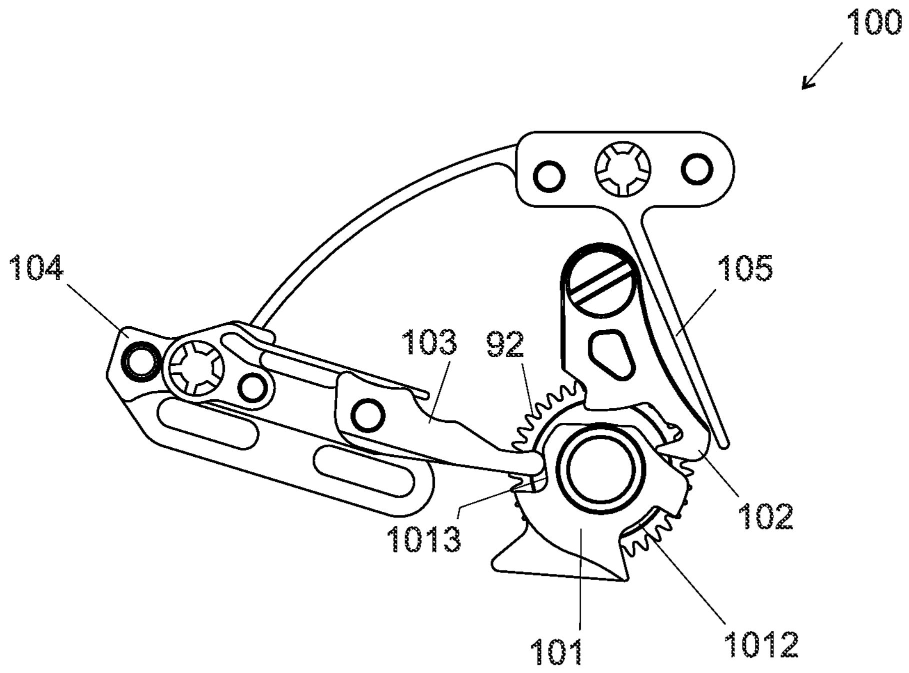
FIG. 10 illustrates a top view of the control mechanism of FIG. 9, in a first selection position, with the control wheel.

In the variant illustrated in FIG. 10, the cam 101 has a slope 1013. When the beak 103 approaches the cam 101, the latter must follow the slope 1013 of the cam 101 in order to push, and as a result, change the relative position of the parts 10, 20.

As can be seen in FIG. 10, when a full push is applied to the control device 104, the bolt 102 will fall into a notch of the cam 101 in order to immobilize it in a first position of rest.

Figure 11:
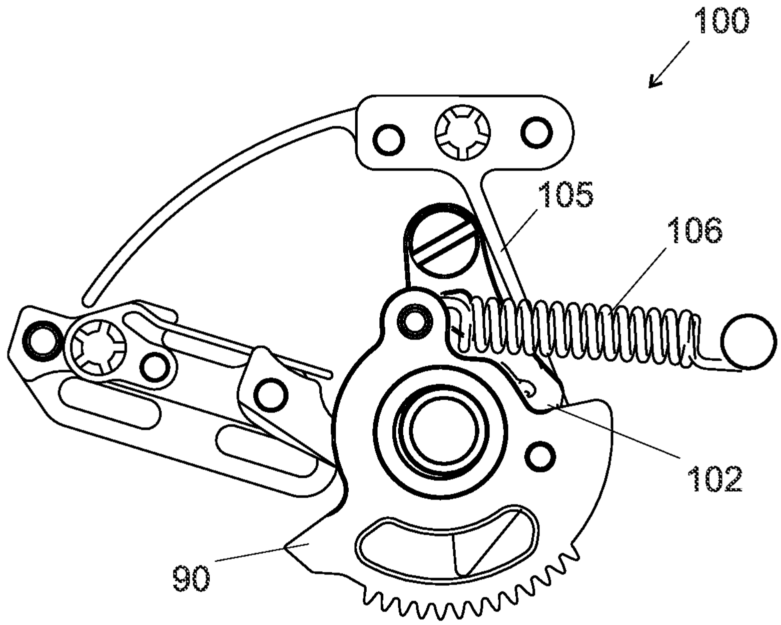
FIG. 11 illustrates a top view of the control mechanism of FIG. 9, in a first, abutment position.
Figure 12:
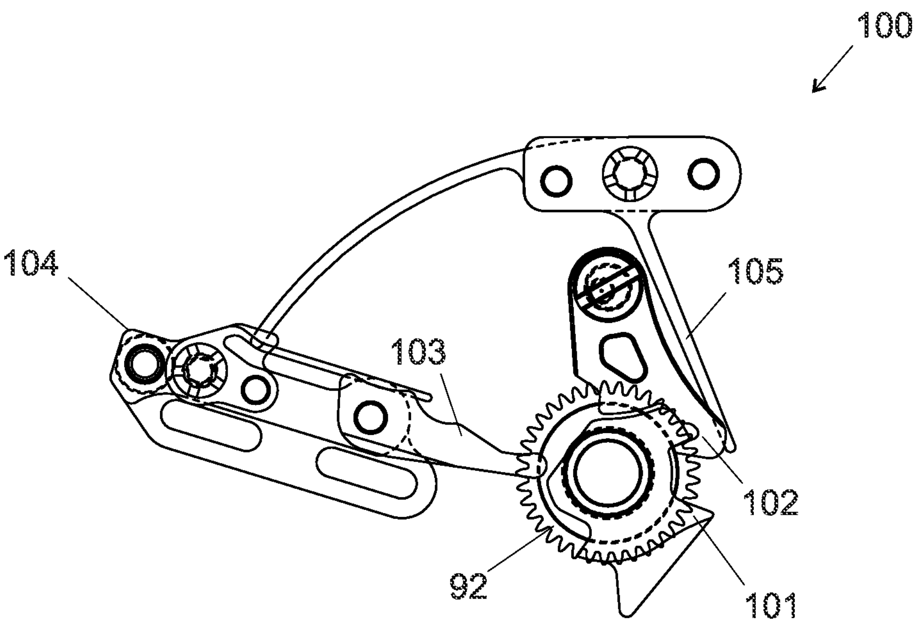
FIG. 12 illustrates a top view of the control mechanism of FIG. 9, in a second rest position.

As can be seen in FIGS. 11 and 12, the bolt has already dropped into the notch 1012 (more visible in FIG. 10) and held in place by its elastic means 105 (a spring in the example illustrated) and by the return of the control wheel 90 which, in turn, is pulled by the elastic means 106 (a helical spring in the example illustrated).

Figure 13:
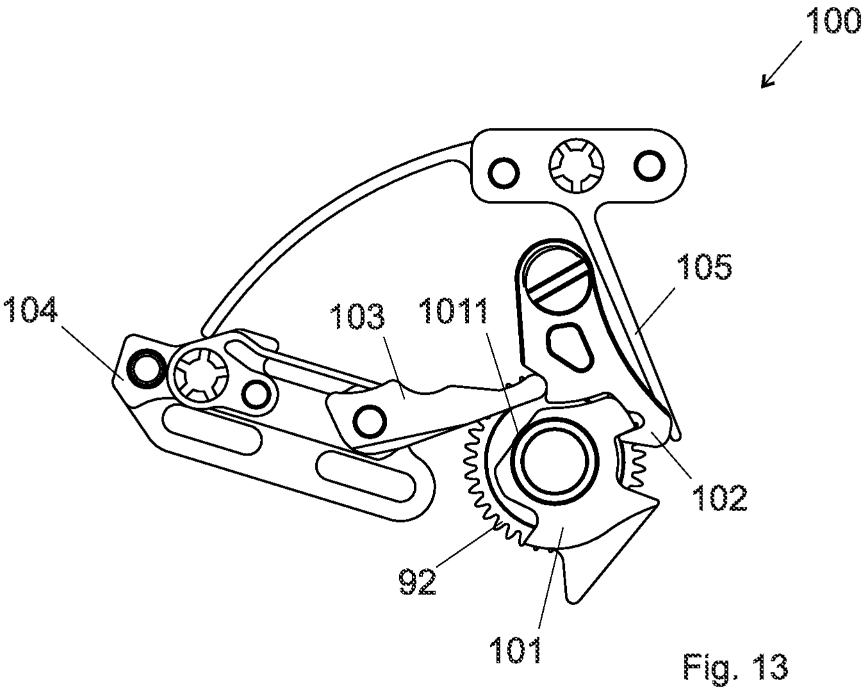
FIG. 13 illustrates a top view of the control mechanism of FIG. 9, in a support position for unlocking.

FIG. 13 illustrates a top view of the control mechanism of FIG. 9, in a support position with the beak 103 bearing on the cam 101 for unlocking. Notably, the beak 103 slides over the cam 101, notably over its substantially rectilinear zone, until the bolt 102 is released from the cam 101. Then, under the effect of the helical spring 106, the control wheel 90 and the cam 101 are repositioned in the initial position.

Figure 14:
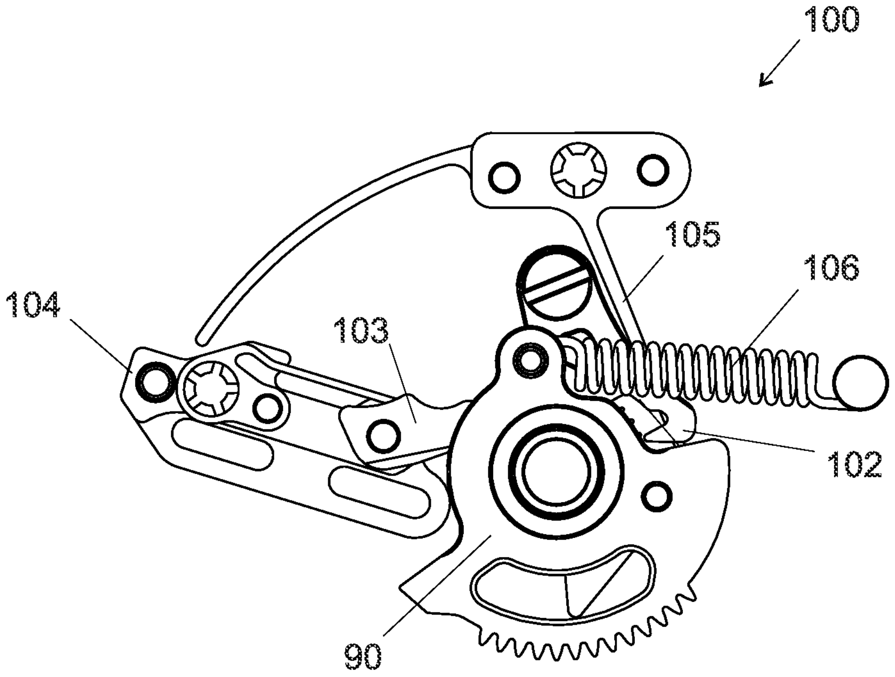
FIG. 14 illustrates a top view of the control mechanism of FIG. 9, in a second abutment position, with the control wheel.

FIG. 14 illustrates a top view of the control mechanism of FIG. 9, in a second position of abutment and with the control wheel 90.

In a variant, the oscillating weight 1 according to the invention comprises a device that makes it possible to check whether the acceleration of the oscillating weight 1 in the context of a configuration such as that of FIG. 1A, and in any case in the context of a configuration other than the configuration with zero winding torque, exceeds a threshold and/or a device that makes it possible to measure the acceleration of such an oscillating weight 1. This device can be completely mechanical, electromechanical and/or electronic, for example an accelerometer.

In the case where the device is completely mechanical, it could comprise an element linked to one of the two parts 10, 20 in such a way that, with an acceleration of the oscillating weight 1 below a certain threshold, it does not change its position, and with an acceleration of the oscillating weight 1 equal to or above a certain threshold, it changes position, this change of position allowing (directly or through another element) the displacement of one part 10, 20 with respect to the other so that the movement of the weight does not wind the energy source of the watch. In this embodiment, it is thus possible to make the geometry of the oscillating weight vary automatically, without the intervention of the user, thus avoiding damaging the watch if the user has not changed the mode of operation of the watch before the watch undergoes a significant acceleration.

REFERENCE NUMBERS EMPLOYED IN THE FIGURES

1 Oscillating weight
10 First part
12 Inertia sector of the first part
14 Cutout of the first part
16 Plate of the first part

17 Arm of the first part
20 Second part
22 Inertia sector of the second part
24 Cutout of the second part
26 Plate of the second part
27 Arm of the second part
30 Differential mechanism
31 First sun gear
32 First intermediate wheel
**33*b*** First planetary wheel
**33*b*** Second planetary wheel
34 Second sun gear
35 Second intermediate wheel
40 First axis of rotation
42 Second axis of rotation
43 Axis of rotation of the first and second intermediate wheels
50 Selection means
60 Indication means
70 Barrel
80 Frame
81 Central portion of the frame
82 End of the frame
83 End of the frame
84 Opening of the frame
89 Toothing of the frame
90 Control wheel
92 Control mechanism wheel
94 Opening of the control wheel
100 Control mechanism
101 Cam
102 Bolt
103 Beak
104 Control device
105 Elastic means (spring)
106 Elastic means
161 First portion of the plate of the first part
162 Second portion of the plate of the first part
261 First portion of the plate of the second part
262 Second portion of the plate of the second part
1011 Rectilinear zone of the cam
1012 Notch of the cam
1013 Slope of the cam
C Contact region between the first part and the second part
F1 Arrow
F2 Arrow

The invention claimed is:

1. A timepiece comprising:

an oscillating weight with variable geometry for a timepiece mechanism for a watch worn by a user, comprising:
- a first part,
- a second part,
- a first axis of rotation common to the first part and to the second part, at least one of the first part and the second part being arranged to be able to oscillate about said first axis of rotation,

- a first sun gear, coaxial with the first part and the second part and linked to the first part;
- a first planetary wheel, comprising a second axis of rotation, said first planetary wheel arranged both to revolve about the second axis of rotation and to revolve about said first sun gear,
- a second sun gear, linked to the second part and coaxial with the first part, the second part and the first sun gear,
- a second planetary wheel, comprising a third axis of rotation, said second planetary wheel being arranged both to revolve about the third axis of rotation and to revolve about said second sun gear, a frame having an axis of rotation and comprising a end bearing said second or third axis of rotation of said first and second planetary wheels, and a toothing, and a control wheel adapted to mesh with said toothing, so as to drive said frame about its axis of rotation, resulting in the rotation of said first and second planetary wheels about their respective axis of rotation and an angular displacement of said first part with regard to said second part.

2. The timepiece as claimed in claim 1, said second axis of rotation being said third axis of rotation.

3. The timepiece as claimed in claim 1, further comprising a first intermediate wheel, between the first planetary wheel and the first sun gear.

4. The timepiece as claimed in claim 3, further comprising a second intermediate wheel, between the second planetary wheel and the second sun gear.

5. The timepiece as claimed in claim 3, the axis of rotation of said frame being the axis of rotation of the first intermediate wheel or wheels and/or a second intermediate wheel or wheels.

6. The timepiece as claimed in claim 4, said first intermediate wheel being coaxial with the second intermediate wheel.

7. The timepiece as claimed in claim 1, further comprising a control mechanism of the control wheel, the control mechanism comprising a control device, a cam coaxial to the control wheel, a beak cooperating with said cam and linked to said control device and a bolt cooperating also with the cam.

8. The timepiece as claimed in claim 7, the control mechanism comprising an elastic means for holding the bolt in a notch of the cam and/or an elastic means for holding the control wheel.

9. The timepiece as claimed in claim 1, further comprising an indicator arranged to indicate an angular difference between the two parts chosen by a wearer of the watch and/or to indicate a mode of operation of the timepiece chosen by the wearer of the watch wherein each mode of operation corresponds to a predetermined configuration of the two parts or a geometry of the oscillating weight chosen by the wearer of the watch and/or to indicate a winding torque of the oscillating weight chosen by the wearer of the watch.

* * * * *